US011354862B2

(12) United States Patent
    Mall

(10) Patent No.: US 11,354,862 B2
(45) Date of Patent: Jun. 7, 2022

(54) CONTEXTUALLY SIGNIFICANT 3-DIMENSIONAL MODEL

(71) Applicant: Universal City Studios LLC, Universal City, CA (US)

(72) Inventor: Howard Bruce Mall, Winter Springs, FL (US)

(73) Assignee: Universal City Studios LLC, Universal City, CA (US)

(*) Notice: Subject to any disclaimer, the term of this patent is extended or adjusted under 35 U.S.C. 154(b) by 140 days.

(21) Appl. No.: 16/719,342

(22) Filed: Dec. 18, 2019

(65) Prior Publication Data

US 2020/0388073 A1    Dec. 10, 2020

Related U.S. Application Data

(60) Provisional application No. 62/858,206, filed on Jun. 6, 2019.

(51) Int. Cl.
| | |
|---|---|
| *G06T 19/00* | (2011.01) |
| *H04N 5/222* | (2006.01) |
| *G06T 15/20* | (2011.01) |
| *H04N 5/232* | (2006.01) |
| *G06T 7/73* | (2017.01) |

(52) U.S. Cl.
CPC .............. *G06T 19/003* (2013.01); *G06T 7/75* (2017.01); *G06T 15/205* (2013.01); *H04N 5/2224* (2013.01); *H04N 5/23238* (2013.01)

(58) Field of Classification Search
None
See application file for complete search history.

(56) References Cited

U.S. PATENT DOCUMENTS

| | | |
|---|---|---|
| 6,081,273 A | 6/2000 | Weng et al. |
| 6,278,460 B1 | 8/2001 | Myers et al. |
| 6,778,171 B1 | 8/2004 | Kikinis |
| 6,856,314 B2 | 2/2005 | Ng |
| 7,027,049 B2 | 4/2006 | Aliaga et al. |
| 8,026,929 B2 | 9/2011 | Naimark |
| 8,218,005 B2 | 7/2012 | Royz et al. |
| 10,249,088 B2* | 4/2019 | Whinnery ............ G06F 3/04886 |
| 10,510,187 B2* | 12/2019 | Groh ........................ G06T 19/20 |

(Continued)

OTHER PUBLICATIONS

"Structure from Motion—Wikipedia", Jan. 30, 2014, p. 1.

(Continued)

*Primary Examiner* — Hilina K Demeter
(74) *Attorney, Agent, or Firm* — Fletcher Yoder P.C.

(57) ABSTRACT

A monitoring system includes a video assembly comprising at least one camera positioned in a predetermined area and configured to transmit a real-time video feed of a physical location in the predetermined area. The monitoring system further includes a control system configured to receive the real-time video feed from the at least one camera. The control system includes a memory device and a processor configured to generate a virtual model of a predetermined area based on instructions stored on the memory device, wherein the processor is configured to incorporate the real-time video feed into the virtual model at a virtual location in the virtual model corresponding to the physical location in the predetermined area. The control system also includes a display unit configured to display the virtual model.

19 Claims, 6 Drawing Sheets

(56) References Cited

U.S. PATENT DOCUMENTS

| | | | |
|---|---|---|---|
| 10,525,364 B2* | 1/2020 | Bluhm | A63G 31/00 |
| 10,699,485 B2* | 6/2020 | Zielkowski | G06T 11/60 |
| 2002/0113805 A1 | 8/2002 | Li et al. | |
| 2011/0273451 A1* | 11/2011 | Salemann | G06T 15/20 |
| | | | 345/427 |
| 2012/0116728 A1 | 5/2012 | Shear et al. | |
| 2014/0240351 A1* | 8/2014 | Scavezze | G06F 3/04815 |
| | | | 345/633 |
| 2015/0097864 A1* | 4/2015 | Alaniz | G01C 21/365 |
| | | | 345/633 |
| 2015/0190726 A1* | 7/2015 | Frolov | A63G 1/02 |
| | | | 472/61 |
| 2016/0048203 A1* | 2/2016 | Blum | G06F 3/011 |
| | | | 104/84 |
| 2016/0346704 A1* | 12/2016 | Wagner | A63G 7/00 |
| 2017/0267099 A1* | 9/2017 | Yerli | B60K 35/00 |
| 2017/0337839 A1* | 11/2017 | Yudofsky | G09B 19/0092 |
| 2018/0089898 A1* | 3/2018 | Huddy | H04W 4/02 |
| 2018/0140957 A1* | 5/2018 | Woodcock | H04N 7/181 |
| 2018/0240166 A1* | 8/2018 | Cronin | H04N 5/77 |
| 2018/0284881 A1* | 10/2018 | Briggs | A63G 21/12 |
| 2018/0369702 A1* | 12/2018 | Hake | A63G 25/00 |
| 2019/0321735 A1* | 10/2019 | Zamperla | A63G 1/30 |

OTHER PUBLICATIONS

Jan Brejcha et al., "Immersive Trip Reports", User Interface Software and Technology, Oct. 11, 2018, pp. 389-401.
PCT/US2020/035830 Invitation to Pay Additional Fees dated Sep. 17, 2020.

* cited by examiner

CONTEXTUALLY SIGNIFICANT 3-DIMENSIONAL MODEL

CROSS-REFERENCE TO RELATED APPLICATIONS

The present application claims the benefit of U.S. Provisional Application No. 62/858,206, entitled "Contextually Significant 3-Dimensional Model" and filed Jun. 6, 2019, the disclosure of which is incorporated herein by reference for all purposes.

BACKGROUND

The present disclosure relates generally to the field of amusement parks. Specifically, embodiments of the present disclosure are related to techniques for monitoring amusement parks and generating models of amusement park attractions that incorporate real-time image data.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Since the early twentieth century, amusement parks have substantially grown in popularity. An increasing amount of people visit amusement park attractions. Amusement park personnel are tasked with monitoring the amusement park attractions to identify schedule deviations and to ensure that guests have positive experiences. Certain amusement park monitoring systems incorporate security cameras throughout the amusement park to provide video feeds for the amusement park personnel to view. In the event of a situation necessitating a maintenance response, such as a guest inadvertently dropping an item onto a ride track, the amusement park personnel are dispatched to clear the issue to prevent or reduce schedule deviations. However, determining the specific location of the maintenance situation may be complicated. When multiple cameras are distributed throughout an attraction, the physical location of each individual camera within the attraction is difficult to ascertain from the acquired images shown on security monitoring screens. Accordingly, it is now recognizable that it is desirable to improve amusement park attraction monitoring systems.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with an embodiment, a monitoring system includes a video assembly comprising at least one camera positioned in a predetermined area and configured to transmit a real-time video feed of a physical location in the predetermined area. The monitoring system further includes a control system configured to receive the real-time video feed from the at least one camera. The control system includes a memory device and a processor configured to generate a virtual model of a predetermined area based on instructions stored on the memory device. The processor is configured to incorporate the real-time video feed into the virtual model at a virtual location in the virtual model corresponding to the physical location in the predetermined area. The control system also includes a display unit configured to display the virtual model.

In accordance with an embodiment, a monitoring system includes a video assembly having at least one camera disposed in a predetermined area and configured to capture and output real-time images. The monitoring system also includes a control system configured to receive the real-time images from the at least one camera. The control system includes a memory device and a processor configured to generate a virtual model of the predetermined area in a virtual space based on instructions stored on the memory device. The processor is configured to generate at least one virtual video display in the virtual space based on the real-time images. A position of the at least one virtual video display in the virtual space is based at least in part on a position of the at least one camera in the predetermined area. The control system also includes a user interface having a display unit configured to display the virtual space for a user. The user interface also includes an input device configured to provide at least one user-initiated command to the processor to control a camera orientation of the at least one camera.

In accordance with an embodiment, a monitoring system includes a video assembly having at least one camera disposed in an amusement park attraction and configured to transmit a video feed of at least a portion of the amusement park attraction, a sensor assembly configured to detect a position of a ride vehicle in the amusement park attraction, and a control system configured to receive the video feed from the at least one camera and the detected position of the ride vehicle. The control system includes a memory device and a processor configured to generate a virtual model of the amusement park attraction and a virtual ride vehicle disposed in the virtual model based on instructions stored on the memory device. The processor is configured to generate a virtual video display in the virtual model based on the video feed, wherein a position of the at least one virtual video display in the virtual model is based at least in part on a position of the at least one camera in the amusement park attraction. A position of the virtual ride vehicle in the virtual model is based at least in part on the detected position of the ride vehicle in the amusement park attraction. The control system may also include a display unit configured to display the virtual model.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Theme park or amusement park personnel are tasked with monitoring amusement park attractions, guests, and other parts of the theme park and amusement park. Certain amusement parks incorporate monitoring systems that provide multiple live feeds to a display unit for the amusement park personnel to observe. For example, multiple live feeds captured from various locations of an amusement park attraction may be arranged in a grid and displayed on a screen for the amusement park personnel. When viewing the live feeds, the amusement park personnel may rely on an organization method, a naming convention, memory, or another suitable method to correlate the live feeds from the grid with their respective physical locations in the amusement park attraction. However, these methods may be complicated to use and may require a high level of familiarity of the amusement park personnel with the physical layout of each attraction. Further, these methods may be increasingly complicated for amusement park attractions with many live feeds. Additionally, these methods may not accurately convey actual physical locations of mobile cameras (e.g., cameras attached to ride vehicles, drones, show elements, etc.) or cameras with a range of views (e.g., swiveling heads). For example, if a camera is installed on a ride vehicle, the physical location of the camera will move along a ride track, which may require the amusement park personnel to guess a current location of the physical camera based on landmarks from the live feed. Moreover, as some amusement parks may incorporate multiple cameras and/or mobile cameras as part of a monitoring system the methods for correlating the live feeds from the grid with their respective physical locations may be increasingly complicated for amusement park personnel, leading to slower responses to detected incidents, increased training needed for amusement park employees, and greater risk of error by amusement park personnel.

Provided herein is a monitoring system that generates a virtual model of an amusement park attraction viewable on a display for the amusement park personnel. Live feeds (e.g., real-time video feeds) from cameras in the amusement park attraction are displayed in the virtual model at locations in the model corresponding to the respective actual physical locations of the cameras in the amusement park attraction, such that the amusement park personnel may view the live feeds at their geographical positions incorporated within a virtual model of the amusement park attraction. As provided herein, the virtual model is a mix of a rendered or schematic model of an amusement park attraction and a live feed, incorporated into the model at locations in the model that correspond to or schematically depict a real-world field of view of each camera. In this manner, the amusement park personnel will be able to see a physical location of a live feed while viewing the live feed in the virtual model. Further, amusement park personnel will be able to accurately determine a physical location of a mobile camera, as the live feed for the mobile camera will be positioned and move in the virtual model based on the actual position and movement of the mobile camera in the amusement park attraction.

Figure 1:
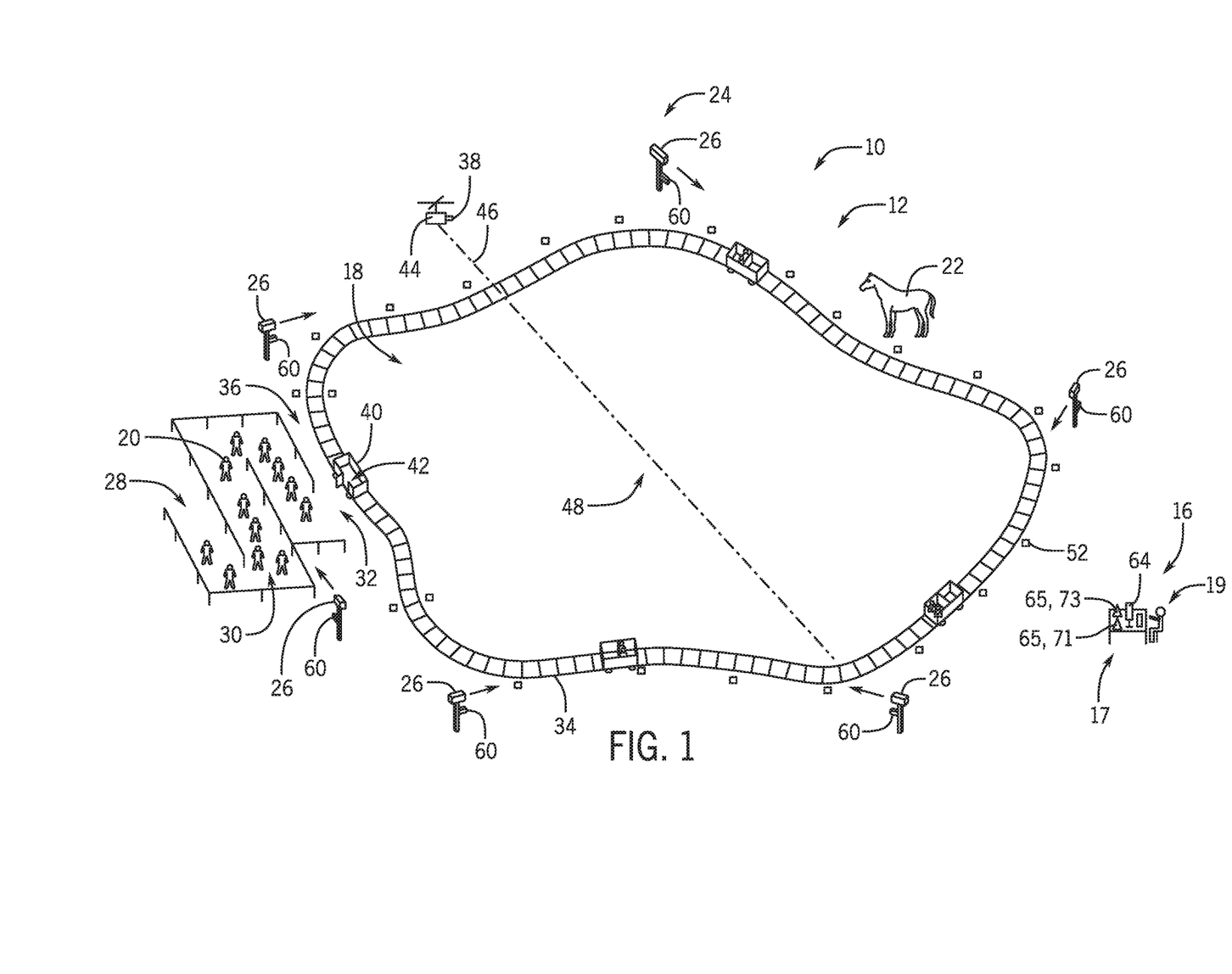
FIG. 1 is a perspective view of an embodiment of a monitoring system for an amusement park attraction.

FIG. 1 is a perspective view of an embodiment of a monitoring system 10 for an amusement park attraction 12 in an amusement park. The monitoring system 10 provides live feeds (e.g., real-time video feeds or real-time images) that may be viewed by amusement park personnel 19 designated to monitor the amusement park attraction 12. Specifically, the monitoring system 10 is configured to display the live feeds, via virtual video displays, in a virtual model of the amusement park attraction to the amusement park personnel 19. In some embodiments, the amusement park personnel 19 may monitor additional amusement park attractions, other portions of the amusement park, or the entire amusement park. In some embodiments, the amusement park personnel 19 may monitor the live feeds for security or maintenance purposes. For example, at least one real-time video feed of the live feeds may show an authorized-personnel only area 18 of the amusement park. The amusement park personnel 19 may observe the real-time video feed to determine if a guest 20 enters the authorized-personnel only area 18, which may be considered an attraction disruption condition. In some embodiments, the amusement park personnel 19 may monitor the real-time video feeds to determine attraction conditions (e.g., schedule, clear track, vehicle operation condition, prop operation condition) of the amusement park attraction 12. For example, the amusement park personnel 19 may be able to determine that a show element 22 (e.g., animatronic figure) is not moving as intended without having to conduct in-person review.

The monitoring system 10 includes a video assembly. The video assembly may include cameras 26 disposed in predetermined areas around the amusement park attraction 12 and configured to capture real-time video or images. For example, the cameras may be disposed at an entrance 28 to the amusement park attraction 12, throughout a line 30 leading to a loading area 32 of the amusement park attraction, in the loading area 32 of the amusement park attraction 12, at various locations along a ride track 34 of the amusement park attraction, on the show elements 22 of the amusement park attraction 12, in authorized-personnel only areas 18 of the amusement park attraction 12, at an unloading area 36 of the amusement park attraction, at an exit of the amusement park attraction 12, or other areas of the amusement park attraction 12. Further, the cameras 26 may be disposed in other areas of the amusement park. For example, the cameras 26 may be disposed at an entrance/exit of the amusement park, along pathways between the amusement park attractions, or in other areas of the amusement park.

In some embodiments, the amusement park attraction 12 may include mobile cameras 38. In some embodiments, the mobile cameras 38 are disposed on a ride vehicle 40 of the amusement park attraction 12, such that the mobile cameras 38 travel along the ride track 34 as the ride vehicle 40 moves along the ride track 34. The mobile cameras 38 may be configured to transmit the real-time video feed of a passenger portion 42 of the ride vehicle 40. In another embodiment, the mobile cameras 38 may be configured to transmit the real-time video feed of the amusement park attraction 12 as the ride vehicle 40 travels along the ride track 34 of the amusement park attraction 12. In further embodiments, the mobile cameras 38 may be configured to articulate based on an input from the amusement park personnel 19. For example, the mobile cameras 38 may be configured to rotate from left to right, up to down, etc. in response to the input from the amusement park personnel 19.

In some embodiments, the mobile cameras 38 may be disposed on aerial drones 44. The aerial drones 44 may be configured to follow a set flight path 46 over the amusement park attraction 12 or over the amusement park. In some embodiments, the amusement park personnel 19 may directly control the aerial drones 44 to observe desired areas of the amusement park attraction 12. For example, the amusement park personnel 19 may desire to view an un-monitored portion 48 of the amusement park, which is not viewable by cameras 26. The amusement park personnel 19 may direct one of the aerial drones 44 to the un-monitored portion 48 of the amusement park to capture a real-time video feed of the un-monitored portion 48 of the amusement park attraction 12.

In some embodiments, the monitoring system 10 includes a sensor assembly. The sensor assembly may be configured to detect trackable objects in the amusement park. The sensors assembly may be configured to track guest devices (e.g., active wearables), the ride vehicles 40, or the show elements 22 in the amusement park attraction 12. For example, the sensor assembly may detect a position of the ride vehicle 40 in the amusement park attraction 12. The sensor assembly may include sensors 52 disposed along the ride track 34 of the amusement park attraction 12. The sensors 52 may include infra-red sensors, magnetic sensors, electric sensors, position sensors, optical sensors, pressure sensors, or any other suitable sensor for detecting the ride vehicle 40.

In some embodiments, the live feeds include real-time audio feeds. In such embodiments, the monitoring system 10 includes an audio assembly. The audio assembly may include audio input devices 60 (e.g., microphones) positioned throughout the amusement park attraction 12. Each audio input device 60 may be positioned proximate one of the cameras 26. In some embodiments, audio input devices 60 may be integrated into the cameras 26. Each audio input device 60 may record live audio at a respective location of the audio input device 60 and transmit a real-time audio feed to a control system 16 for the amusement park attraction 12 based on the recorded live audio. The monitoring system 10 may be configured to generate an audio output feed for the virtual model based on the real-time audio feeds from each of the audio input devices 60 in the amusement park attraction 12. In one example, sound sources in the virtual model allow a user interface in which sound is spatialized.

In some embodiments, a user interface 17 of the monitoring system 10 includes a display unit 64 (e.g., monitor, screen of a personal computing device, etc.) and an audio output device 65 (e.g., speakers, headphones, etc.). The virtual model 62, which includes the real-time video feeds of the amusement park attraction, may be displayed on the display unit 64 for amusement park personnel 19 to monitor the amusement park attraction 12. Additionally, the audio output device 65 may be configured to output the audio output feed for the amusement park personnel 19. The audio output feed may include the real-time audio feed corresponding to a first audio input device 60 disposed proximate the camera 26 providing the real-time video feed most prominently displayed on the display unit 64.

In some embodiments, the monitoring system 10 for the amusement park attraction may generate spatial audio for the virtual model 62. The spatial audio may be generated using the locations of the audio input devices 60 and their corresponding real-time audio feeds. Spatial audio includes audio based on position. That is, as the amusement park personnel 19 move a virtual camera (i.e., a camera disposed in the virtual model 62 and configured to provide the image displayed on the display unit 64), the audio output feed changes based on the location of the user camera (e.g., virtual camera) in the virtual model. The audio output feed may change based on the location of the virtual camera with respect to the real-time video feeds. The audio output feed may be given direction and volume based on a distance and a rotation of the virtual camera with respect to the real-time audio feeds. For example, sounds from a first real-time audio feed disposed to the left of the virtual camera may be output by a left speaker 71 of the audio output device 65, whereas sounds from a second real-time audio feed disposed to the right of the virtual camera may be output by a right speaker 73 of the audio output device 65. Moreover, a volume of sounds output in the audio output feed from a real-time audio feed disposed proximate the virtual camera may generally be louder than sounds from another real-time audio feed disposed further away from the virtual camera. Accordingly, the volume of the sounds may be based on proximity of the real-time audio feeds to the virtual camera. Providing spatial audio to amusement park personnel 19 may help amusement park personnel 19 monitor locations of the amusement park attraction 12 not displayed in the real-time video feeds observable via the display unit 64.

Figure 2:
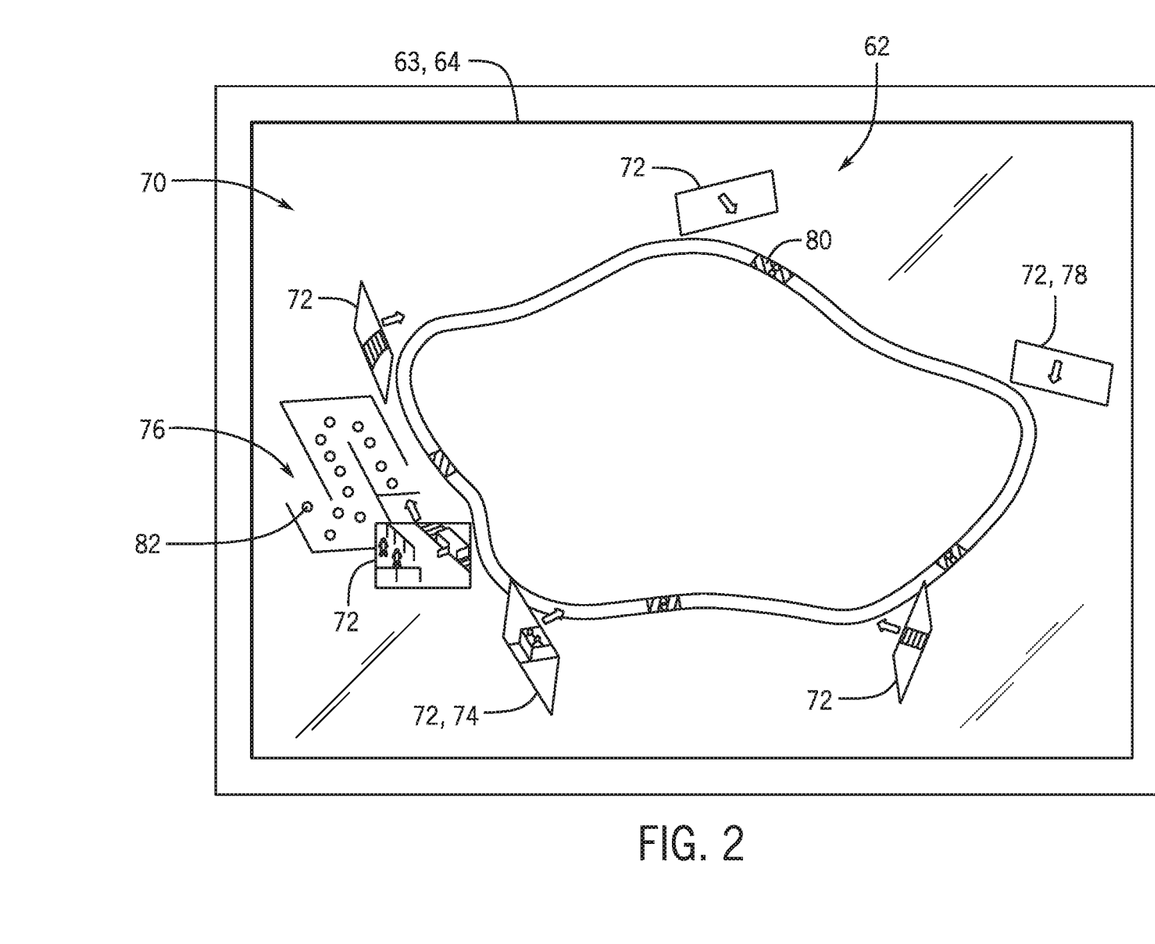
FIG. 2 is a perspective view of an embodiment of a virtual model of an amusement park attraction.

FIG. 2 is a perspective view of an embodiment of the virtual model 62 of the amusement park attraction shown on a display unit 64 and according to the disclosed techniques. The virtual model 62 is shown on the display unit 64 from a perspective of the virtual camera 63 controllable by the amusement park personnel 19 via the control system. The control system may be configured to generate the virtual model 62 of the amusement park attract based on instructions stored on a memory device of the control system. The virtual model 62 may depict one or more areas of the attraction 12 of FIG. 1, including the entrance 28 to the amusement park attraction, the line 30 leading to the loading area of the amusement park attraction, the loading area 32 of the amusement park attraction, the ride track 34, ride vehicles 40, show elements 22, the authorized personnel only areas 18 of the amusement park attraction, the unloading area 36 of the amusement park attraction, the exit of the amusement park attraction, and/or any other portions of the amusement park attraction.

In some embodiments, the virtual model 62 may be a three-dimensional representation of the amusement park attraction positioned in a virtual space 70. The three-dimensional representation may be a virtual replica of the amusement park attraction. In one embodiment, the three-dimensional representation may be rendered to the scale of the actual amusement park attraction such that geospatial relationships between portions of the amusement park attraction are represented in the virtual model 62.

In some embodiments, the virtual model 62 may omit various levels of detail of the amusement park attraction to simplify the virtual model 62. That is, the virtual model 62 may be a schematic version of the attraction, showing only certain elements. In one embodiment, the virtual model 62 shows the walls of the attraction, a ride track, and schematically-rendered vehicles. The virtual model 62 may be rendered at least in part as a computer-generated line drawing. In another embodiment, the virtual model 62 is a two-dimensional representation of the amusement park attraction. For example, the virtual model 62 may be a top view of the amusement park attraction. In some embodiments, the two-dimensional representation may be an illustrative representation of the amusement park attraction. For example, the amusement park attraction may be multi-leveled, such that a top view would overlap portions of the amusement park attraction. The illustrative representation may hide, move, or resize portions of the amusement park attraction such that desired portions of the amusement park attraction are viewable in the virtual model 62. Each of the representations (e.g., two-dimensional and three-dimensional) may provide unique benefits to the monitoring system. For example, the three-dimensional representation may provide the amusement park personnel with a more accurate virtual model 62 and the two-dimensional representation may provide the amusement park personnel with a single illustrative view for ease of viewing. In some embodiments, the monitoring system may be configured to display both the three-dimensional representation and the two-dimensional representation of the virtual model 62 for the amusement park personnel.

Moreover, the control system is configured to generate at least one virtual image or video display 72 incorporated into the virtual model 62 or virtual space 70. As set forth above, the cameras and/or mobile cameras may be configured to transmit the real-time video feeds. The control system may be configured to receive the real-time video feeds and generate respective virtual video displays 72 in the virtual model 62 or virtual space 70. As provided herein, a virtual video display may refer to a display of the real-time video feed incorporated within the virtual model 62. That is, the virtual video display may display the acquired camera feed. The virtual video displays 72 may be positioned at a virtual location in the virtual model 62 or virtual space 70 based at least in part on respective actual physical locations of the at least one camera in the amusement park attraction. The virtual location may be based on the scale of relationships of the virtual model 62 or based on relative positions of landmarks within the virtual model 62. For example, if an attraction has cameras positioned roughly equidistantly about the track (e.g., at about every 60 degrees about a circular track), the virtual displays 72 may be distributed about the rendered virtual track in a similar manner. Further, if the attraction has one or more props and cameras positioned adjacent to such props, the props may be rendered using line drawings or simplified prop images, and the virtual video displays 72 from the adjacent cameras may be positioned based on the captured field of view about the prop, e.g., in front of the prop, next to the prop.

In one example, an individual camera of FIG. 1 may be positioned proximate the loading area of the amusement park attraction. Therefore, a respective first virtual video display 72 may be positioned at a virtual location rendered or displayed within the portion of the virtual model 62 shown as proximate a virtual loading area 76. Further, the virtual video display 72 may be located in the model at a location of the camera itself or at a location corresponding to the captured field of view of the camera.

In some embodiments, the virtual video display 72 includes a two-dimensional virtual display positioned in the three dimensional virtual model or space. An orientation of the two-dimensional virtual display (e.g., the first virtual video display 74) may be based at least in part on an orientation of the at least one camera in the amusement park attraction. For example, in FIG. 1, the at least one camera is oriented such that the camera is directed toward the loading area of the amusement park attraction. In the virtual model 62, the two-dimensional virtual display may be oriented toward the virtual loading area 76 of the amusement park attraction, such that the two-dimensional virtual display is positioned and oriented in the virtual model 62 or virtual space 70 corresponding to a perspective of the at least one camera.

In some embodiments, the control system is configured to adjust a camera position and angle viewable by the display unit 64 in the virtual space 70 based on inputs from the amusement park personnel to view each of the virtual video displays 72. For example, a second virtual video display 78 is not viewable for the amusement park operator in the illustrated embodiment. However, the amusement park operator may adjust the camera position and angle to view the virtual model 62 or virtual space 70 from the opposite side of the virtual model 70 such that the second virtual video display 78 is viewable for the amusement park operator. In another embodiment, the control system is configured to maintain the camera position and angle of the virtual space 70, but rotate, pan, etc. the virtual model 62 to view each of the virtual video displays 72.

In some embodiments, the at least one camera of FIG. 1 is configured to capture and output a panoramic real-time video feed. The control system may be configured to generate a three-dimensional virtual video display configured to display the panoramic real-time video feed in the virtual model 62. The three-dimensional virtual video display may display a first portion of the panoramic real-time video feed when viewing the virtual model 62 from a first camera position and angle of the virtual space 70, and the three-dimensional virtual video display may display a second portion of the panoramic real-time video feed when viewing the virtual model 62 from a second camera position and angle.

As set forth above, in some embodiments, the monitoring system includes a sensor assembly configured to detect trackable objects (e.g., guest devices, ride vehicles, show elements) in the amusement park and output a detection signal to the control system for the amusement park or amusement park attraction. The control system may be configured to receive the detection signal and move portions of the virtual model 62 based on the detection signal. For example, the sensor assembly may detect a position of the ride vehicle and output the detection signal to the control system. The control system may re-position/update a position of a respective virtual ride vehicle 80 in the virtual model 62 based on the detection signal such that the respective virtual ride vehicle 80 is positioned in the virtual model 62 or virtual space 70 to represent the actual position of the ride vehicle in that actual amusement park attraction. In one embodiment, the virtual ride vehicle 80 moves along the track in a manner that corresponds to the movement of the actual ride vehicle along the physical track. As the actual ride vehicle enters the field of view of a camera and is visible in the virtual video display 72 in the virtual model 62, the virtual ride vehicle 80 may temporarily not be displayed in the portion of the virtual model corresponding to the virtual video display 72. As the actual ride vehicle moves out of the field of view, the virtual vehicle 80 may be displayed again.

An operator viewing the virtual model 62 on the display unit 64 would see rendered or virtual vehicles 80 traverse the ride track over time such that an operator, at a glance, would know where in the virtual space 70 each virtual ride vehicle 80 is located. This view would translate more easily to envisioning where each actual vehicle in the actual attraction is located, permitting the operators to more easily monitor the attraction and without the need to switch between multiple camera feeds that are display in a manner disconnected from the attraction space. Further, because certain elements of the virtual model 62 (track, walls, loading area) are unchanging between different ride cycles, the computational power of the model may be relatively lower than that of model in which each element is rendered de novo for each cycle of the ride. However, while certain portions of the model may remain relatively static, the moving elements of the virtual model such as the virtual ride vehicles may be rendered in a schematic manner to lower computational complexity. Further, the incorporation of the real-time video feed enhances the information available in the model while maintaining the advantage of relatively lower computational power compared to de novo rendering of the attraction elements for each cycle of the ride.

In some embodiments, the sensor assembly may detect a guest device corresponding to a guest and output a guest detection signal to the control system. The guest detection signal may include a detected position of the guest device with respect to the amusement park attraction. The control system is configured to receive the guest detection signal position of the guest device and generate a guest avatar 82 in the virtual model 62 or virtual space 70. A position of the guest avatar 82 in the virtual model 62 may be based at least in part on the detected position of the guest device in the amusement park attraction such that the guest avatar 82 is positioned in the virtual model 62 to represent a position the guest corresponding to the detected guest device in the actual amusement park attraction. In some embodiments, a form of the guest avatar 82 may be based on instructions stored on the memory device. In some embodiments, the form of the guest avatar 82 may be based on guest identification information associated with the guest device. For example, the guest information may indicate that the guest is an adult. Thus, the control system may generate an adult sized avatar. In other embodiments, the guest avatar 82 may be a shape (e.g., circle, square, etc.) configured to represent the guest corresponding to the detected guest device. Further, as the guest moves around the physical attraction, the position of the avatar 82 and/or the vehicle 80 in the virtual model 62 may be updated based on updated position information.

As set forth above, a display unit 64 is configured to display the virtual model 62. The display unit 64 may be a computer monitor, television, computer screen, mobile device screen (e.g., cell phone screen, tablet screen, etc.), or another suitable display unit 62. However, in some embodiments, the virtual space 70 is a virtual reality environment. The amusement park personnel may view the virtual model 62 in the virtual reality environment view a virtual reality headset. The amusement park personnel may move inside the virtual reality environment and view the virtual video displays 72 positioned in the virtual reality environment. Further, the amusement park personnel may move with six degrees of freedom in the virtual reality environment. In another embodiment, the virtual space is an augmented reality environment. The amusement park personnel may view the virtual model in the augmented reality environment with an augmented reality headset.

In some embodiments, the amusement park operator may view prior recorded feeds via the virtual video displays 72. The amusement park operator may rewind, fast-forward, slow, or pause a prior record video feed for a particular virtual video display 72, such that the amusement park personnel may review prior footage at a particular camera location. For example, the amusement park operator may monitor multiple virtual video displays 72 and may not see an incident through a particular video display. The amusement park operator may review the prior recorded feeds at the particular camera location via the virtual video display to have a more comprehensive account of the incident.

Figure 3:
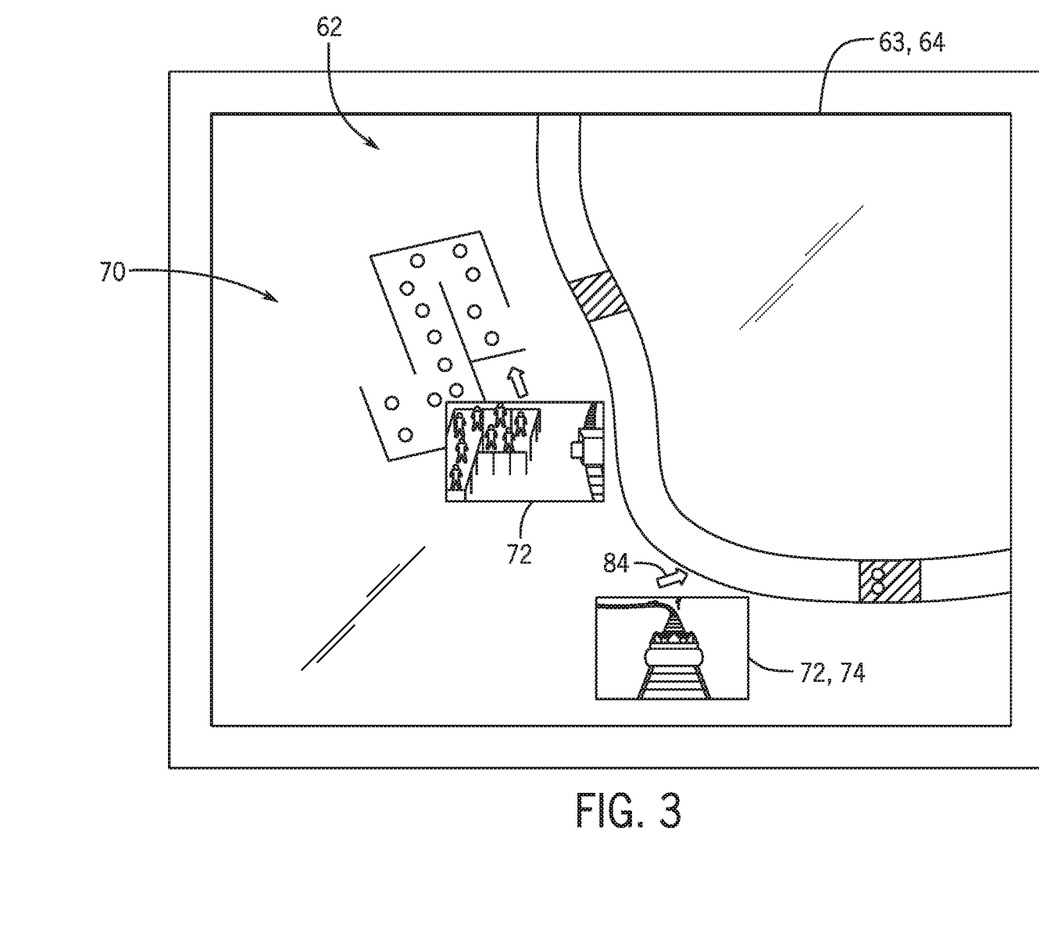
FIG. 3 is a perspective view of an embodiment of the virtual model having virtual display screens configured to rotate with respect to the virtual model.

FIG. 3 is a perspective view of an embodiment of the virtual model 62 having virtual video displays 72 configured to rotate with respect to the virtual model 62. The amusement park personnel may desire to view a particular virtual video display (e.g., the first virtual video display 74, etc.) from a current display unit 64 camera orientation (e.g., position and angle with respect to the virtual model 62 or virtual space 70 viewable on the display unit 64). However, the first virtual video display 74 may not be viewable from the current display unit 64 camera orientation. In some embodiments, the virtual video displays 72 (e.g., the first virtual video display 74) may be configured to rotate with respect to the virtual model 62 in the virtual space 70 based at least in part on an input from the input device. For example, the amusement park personnel may manually enter the input into the input device to cause the first virtual video display 74 to rotate about ninety degrees such that the first virtual video display 74 is viewable from the current display unit 12 camera orientation. In some embodiments, the virtual video displays 72 may be configured to rotate any number of degrees.

In another embodiment, the virtual video displays 72 may be configured to automatically rotate to align the virtual video displays 72 with the current display unit 64 camera orientation, such each of the virtual video displays 72 are viewable on the display unit 64 from the current display unit 64 camera orientation. The virtual video displays 72 may be configured to automatically update their respective orientations based on a change to the current display unit 64 camera orientation. As automatically rotating the virtual video displays 72 may allow the amusement park personnel to view all of the virtual video displays 72 simultaneously, automatically rotating the virtual video displays 72 may reduce blind spots in the monitoring system for the amusement park personnel.

In some embodiments, the virtual model 62 includes orientation indicators 84 disposed proximate the virtual video displays 72. The orientation indicators 84 may be configured to show an actual orientation of the camera providing the real-time video feed for the virtual video display 72, such that the amusement park personnel may determine an actual orientation of the camera corresponding to a rotated virtual video display 72.

Figure 4:
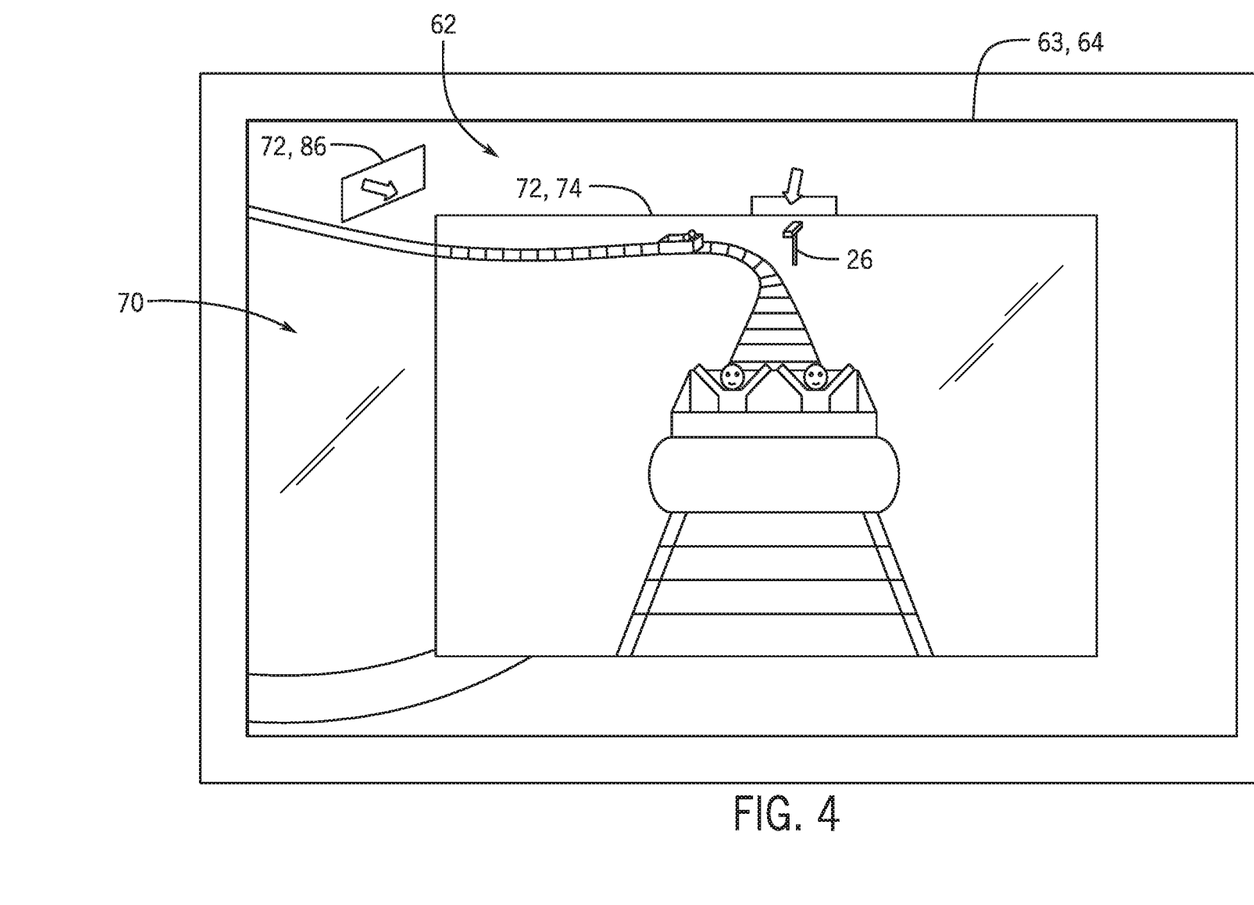
FIG. 4 is a perspective view of an embodiment of the virtual model re-oriented based at least in part on a user input.

FIG. 4 is a perspective view of an embodiment of the virtual model 62 re-oriented based at least in part on a user input. In the illustrated embodiment, the virtual model 62 is a three-dimensional virtual model, and multiple two-dimensional virtual video displays 72 are positioned in the virtual space 70 with respect to the three-dimensional virtual model 62 based on actual positions of the cameras 26 in the amusement park attraction. The virtual model 62 may be viewable by the amusement park personnel via the display unit 64. The monitoring system includes a user interface, and the user interface includes the display unit 64. Further, the user interface may include at least one input device. The input device may include a keyboard, a mouse, a joystick, a touchpad, or any other suitable input device.

The amusement park personnel may re-orient a view of the virtual model 62 on the display unit 64 (e.g., change the display unit 64 camera orientation) using the at least one input device. The amusement park personnel may input at least one user-initiated command into the at least one input device to re-orient the view of the virtual model 62. In some embodiments, the input device may be configured to additionally control a display unit 64 camera position in the virtual space 70. In some embodiments, the at least one user-initiated command is configured to control the display unit 64 camera orientation with six degrees of freedom. That is, the at least one user-initiated command is configured to control forward-backward movement, up-down movement, side-to-side movement, roll, pitch, and yaw of the display unit 64 camera orientation.

For example, a first display unit 64 camera orientation, as shown in FIG. 2, may position the display unit 64 camera on a first side of the virtual model 62 and up in the air above the virtual model 62 of the amusement park attraction. The first current display unit camera may be oriented downward toward the virtual model 62 of the amusement park attraction. In a second display unit 64 camera orientation, as illustrated in the present embodiment, the second camera is positioned on a second side of the amusement park attraction and positioned down close to a ground surface of the virtual model 62 of the amusement park attraction. Further, the second display unit 64 camera is oriented toward an opposed side of the virtual model 62 and toward the first virtual video display 74.

The amusement park personnel may alter a size of the virtual video displays 72 via the at least one user-initiated command into the at least one input device. For example, the amusement park personnel may enlarge the virtual video displays 72 for ease of viewing. In another example, the first virtual video display 74 may obscure the view of a second virtual video display 86 from a current display unit 64 camera orientation. Instead of changing the display unit 64 camera orientation to better see the second virtual video display 86, the amusement park personnel may scale down a size of the first virtual video display 74 and/or enlarge the scale of the second virtual video display 86 such that the second virtual video display 86 is viewable from the current display unit 64 camera orientation. In some embodiments, the amusement park personnel may individually alter a size of each virtual video display 72. In another embodiment, the size of the virtual video display 72 with respect to the virtual model 62 is based at least in part on instructions stored on the memory device, an input from the input device, a trigger event, or some combination thereof.

Moreover, rendering of the virtual model 62 and the real-time video feeds for the respective virtual video displays 72 may include level of detail rendering, such that the rendering increasingly decreases the complexity of portions of the virtual model 62 and the real-time video feeds based on distance from the virtual camera 63. For example, portions of the virtual model 62 disposed proximate the virtual camera 63 may have higher complexity than portions of the virtual model 62 disposed further away. Additionally, the real-time video feeds disposed far away from the virtual camera may have a low video resolution and the video resolution of the real-time video feeds may increase as you get closer to the virtual camera 63. Further, a proximity of the virtual camera 63 to a virtual video display 72, corresponding to a camera (e.g., real-world camera), may control the video resolution of the real-time video feeds output by the real-world camera. For example, the real-world camera may capture and output high resolution video to the control system when the virtual camera 63 is disposed proximate a virtual video display 72 corresponding to the real-world camera. However, the real-world camera may reduce a quality of the real-time video feed captured and output by the real-world camera as the virtual camera 63 moves away from the virtual video display 72 corresponding to the real-world camera. Reducing video resolution of some real-world cameras may reduce overall network bandwidth. Moreover, the control system may shut down real-world cameras (e.g., cease to capture video, output the real-time video feed, or some combination thereof) when the virtual video displays 72 corresponding to the respective real-world cameras are not within the view of the virtual camera 63.

Figure 5:
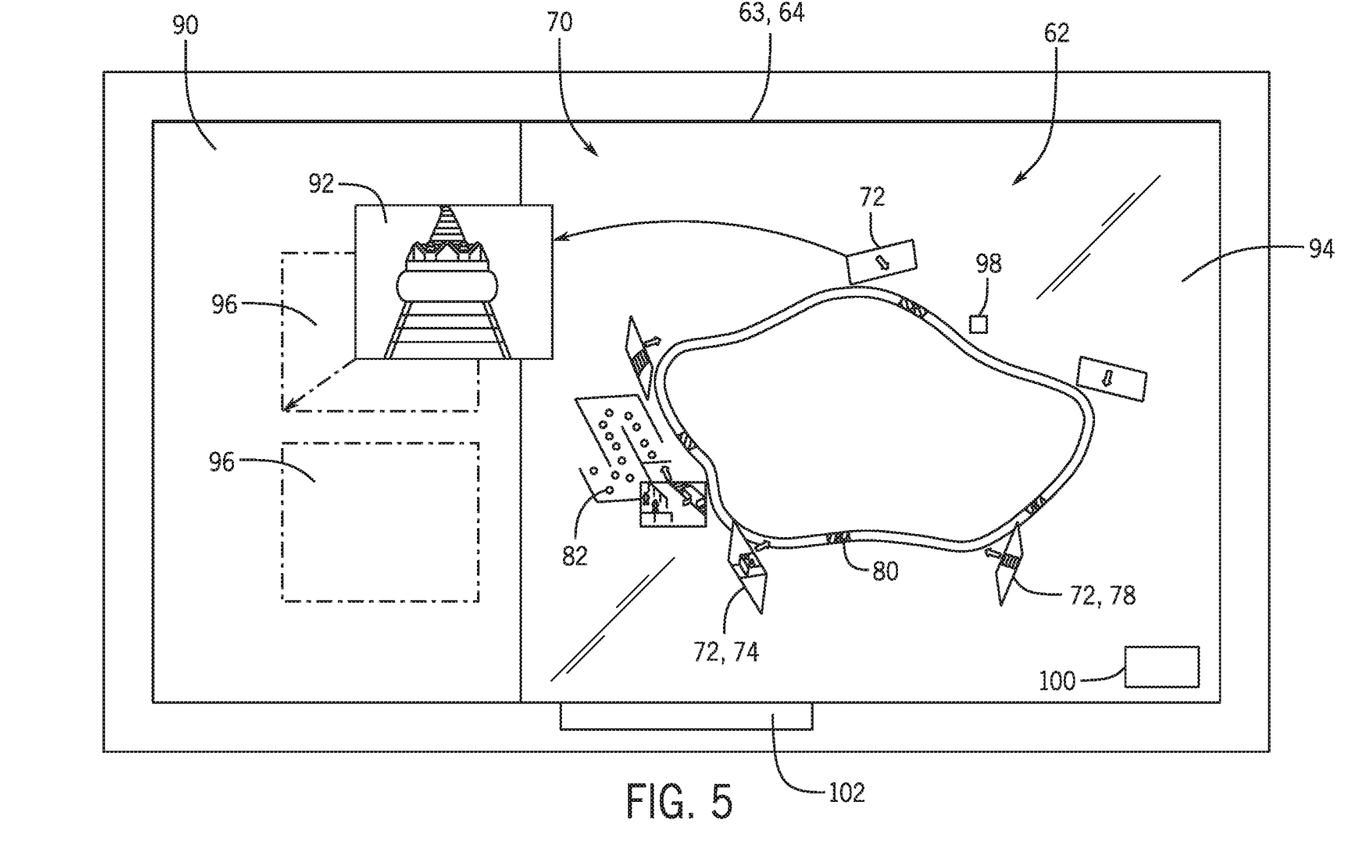
FIG. 5 is a is a perspective view of an embodiment of the virtual model having a viewing window configured to display a video feed corresponding to at least one virtual display screen.

FIG. 5 is a perspective view of an embodiment of the virtual space 70 having a viewing window 90 configured to display a video feed 92 corresponding to at least one virtual video display 72. The monitoring system may be configured to generate the viewing window 90 to allow the amusement park personnel to view selected video feeds 92 in a stationary portion of the display unit 64 that is independent of the virtual model 62. The viewing window 90 may be configured to remain stationary when the amusement park personnel change the display unit 64 camera orientation to view a different perspective or portion of the virtual model 62 of the amusement park attraction. The viewing window 90 may be a separate window or portion of a program window 94 displaying the virtual model 62. The viewing window may have preset panes 96 configured to receive and display the video feeds 92 from the selected virtual video displays 72. The amusement park personnel may select the virtual video displays 72 via the input device. For example, the amusement park personnel may select the virtual video displays 72 by clicking on the virtual video displays 72 in the virtual space and dragging the virtual video displays 72 toward the preset panes 96. Based on the user-initiated command, the viewing window 90 may display the video feed 92 corresponding to the virtual video display 72 clicked and dragged to the preset pane 96.

In some embodiments, the monitoring system may provide an option, selectable via the input device, to hide the viewing window 90. Further, the monitoring system may include a filter tool 100. The filter tool 100 may be configured to selectively toggle/hide at least one of the virtual video displays 72, the virtual ride vehicles 80, the guest avatars 82, virtual show elements 98, portions of the virtual model 62 of the amusement park attraction, or some combination thereof. The filter tool 100 may be a tool for the amusement park personnel to selectively simplify the virtual model 62. Moreover, filter tool 100 may be tool configured to adjust the opacity of the virtual video displays 72, the virtual ride vehicles 80, the guest avatars 82, virtual show elements 98, portions of the virtual model 62 of the amusement park attraction, or some combination thereof. The filter tool 100 may be configured to adjust the opacity of the virtual video displays 72 individually. In some embodiments, the filter tool 100 may have condition based options to automatically adjust opacity of at least one virtual video display 72 under preset conditions. For example, the filter tool 100 may be configured to reduce the opacity of the first virtual video display 74 when, from the perspective of the virtual camera displayed on the display unit, at least a portion of the second virtual video display 78 is behind the first virtual video display 74, such that the first virtual video display 74 becomes at least partially transparent and the second virtual video display 78 is at least partially viewable through the first virtual video display 74.

In some embodiments, the user interface includes an audio output device 65. The audio output device 65 is configured to output audio captured by the audio input devices disposed throughout the amusement park attraction. As set forth above, in some embodiments, audio input devices are disposed proximate respective cameras. The audio input devices may be configured to capture audio proximate the cameras. In some embodiments, the audio output devices 65 are configured to output the audio feed, captured by a respective audio input device, when the at least one virtual display corresponding to the at least one camera is selected by the input device. For example, clicking on a virtual video display, via the input device, may cause the audio output device to output the sound captured by the audio input device disposed proximate the camera corresponding to the selected virtual video display to allow the amusement park personnel to hear audio around the amusement park attraction via the monitoring system.

Figure 6:
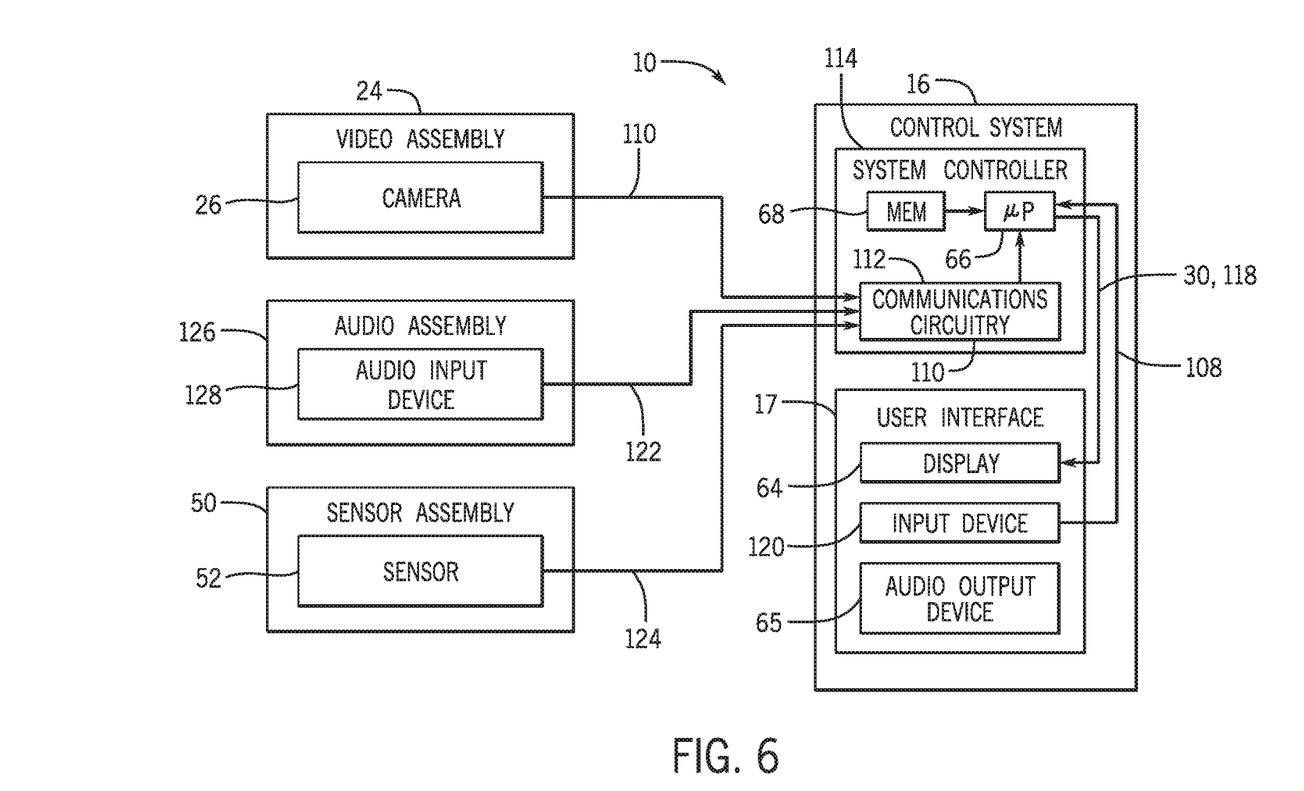
FIG. 6 is a block diagram of an embodiment of the monitoring system.

FIG. 6 is a block diagram of an embodiment of the monitoring system 10. The monitoring system 10 includes a control system 16 and a video assembly 24. The video assembly 24 is configured to capture and transmit real-time video feed data 110 to the control system 16. The video assembly 24 includes the cameras 26. In some embodiments, the cameras 26 are configured to output the captured real-time video feed data 110 directly to a controller of the video assembly. In another embodiment, the cameras 26 are configured to output the captured real-time video feed data 110 directly to the control system 16. The control system 16 may include communications circuitry 112 configured to receive the real-time video feed data 110 or real-time images data from the video assembly 24 or the cameras 26. The communications circuitry 112 may include antennas, radio transceiver circuits, and signal processing hardware and/or software (e.g., hardware or software filters, A/D converters, multiplexers amplifiers), or a combination thereof, and that may be configured to communicate over wireless communication paths via Infrared (IR) wireless communication, satellite communication, broadcast radio, Microwave radio, Bluetooth, Zigbee, Wifi, UHF, NFC, etc. In one embodiments, the communication circuitry 112 includes a plurality of IR transceivers disposed in the amusement park or the amusement park attraction.

The control system 16 may also include system controller 114 having a system processor 66 and a memory 68. The system processor 66 may include one or more processing devices, and the memory 68 may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the system processor or by other processor-based devices (e.g., mobile devices). In some embodiments, the memory device 68 is configured to store video footage from the real-time video feed data 110. In some embodiments, the memory 68 is configured to store instructions executable by the system processor 66 to output various control system signals. For example, the system processor may execute instructions to generate a virtual model of a predetermined area based on instructions stored on the memory device 68.

Further, the system processor 66 is configured to generate a virtual video display in the virtual model based on the real-time video feed data 110 received from the video assembly 24 and/or the cameras 26. The system processor 66 may be configured to output the virtual model and the virtual video displays to a display unit 64 of a user interface 17 via a display signal 118. In some embodiments, the system processor 66 is configured to output the display signal 118 to the display unit 64 of the user interface 17 via a wired connection. However, in some embodiments, a wireless device may include the display unit 64. Thus, the system processor 66 may be configured to output the display signal 118 to the display unit 64 of a user interface 17 via the communications circuitry 112. As set forth above, the display unit 64 may include a computer monitor, television, computer screen, mobile device screen (e.g., cell phone screen, tablet screen, etc.), or another suitable display unit. The display unit 64 is configured to display the virtual model and the virtual video displays in the virtual space for the amusement park personnel.

The user interface 17 may also include an input device 120 configured to provide the at least one user-initiated command 108 to the system processor 66. The at least one user command 108 may include instructions to control portions of the monitoring system 10. For example, the at least one user command 108 may control the display unit 64 camera orientation for the display unit 64 in the virtual space. In some embodiments, the at least one user command 108 is configured to actuate at least one of the cameras 26 to change an orientation of the camera 26 in the amusement park attraction. Further, in some embodiments, the at least one user command 108 may be configured to control the mobile cameras. For example, the mobile camera may include a drone mounted camera or a camera mounted on a ride vehicle. The at least one user command 108 may be configured to control a flight path of the at least one drone to view a particular portion of the amusement park attraction.

In some embodiments, the user interface 17 also includes an audio output device 65. The audio output device 65 may be configured to output an audio feed 122 when the at least one virtual display corresponding to the at least one camera 26 is selected by the input device 120 based on the at least user command. The audio output device 102 may include speakers or any other suitable audio device for outputting audio feed.

In some embodiments, the monitoring system 10 includes the sensor assembly 50, which may include the sensors 52 disposed throughout the amusement park attraction. As set forth above, the sensors 52 may be configured detect a position of the ride vehicle in the amusement park attraction. The sensors 52 and/or sensor assembly 50 may be configured to output a detection signal 124 of the ride vehicle to the communication circuitry 112 of the control system 16 of the amusement park attraction. The control system 16 may be configured to receive the detection signal 124 and position the virtual ride vehicle in the virtual model based at least in part on the detected position of the ride vehicle in the amusement park attraction. In some embodiments, the sensors 52 are configured to output the detection signal 124 to the sensor assembly 50. The sensors 52 may be configured to output the detection signal 124 over a wired or wireless network.

In some embodiments, the monitoring system 10 includes an audio assembly 126. The audio assembly 126 may include at least one audio input device 128 positioned proximate the at least one camera 26 in the amusement park attraction. The audio input device 128 and/or audio assembly 126 may be configured to transmit the audio feed 122 to the communications circuitry 112 of the control system 16.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A monitoring system, comprising:
a video assembly comprising at least one camera positioned in a predetermined area and configured to transmit a real-time video feed of a physical location in the predetermined area; and
a control system configured to receive the real-time video feed from the at least one camera, wherein the control system comprises:
a memory device;
a processor configured to generate a virtual model of the predetermined area based on instructions stored on the memory device, wherein the processor is configured to incorporate the real-time video feed into the virtual model at a virtual location in the virtual model corresponding to the physical location in the predetermined area and such that the real-time video feed is overlaid on the virtual model, wherein the virtual model comprises a representation of a virtual vehicle in the predetermined area such that the virtual model transitions from the virtual vehicle to the real-time video feed of an actual vehicle while the actual vehicle passes through the physical location corresponding to the virtual location; and
a display unit configured to display the virtual model.

2. The monitoring system of claim 1, wherein the virtual location corresponds to a field of view of the at least one camera, and wherein the virtual location is configured to adjust or move within the virtual model upon adjustment of the field of view by an operator.

3. The monitoring system of claim 1, wherein the virtual model comprises a three-dimensional virtual model, and wherein a display of the real-time video feed comprises a two-dimensional display positioned in the three-dimensional virtual model such that at certain orientations of the virtual model, the real-time video feed is not visible.

4. The monitoring system of claim 1, wherein the at least one camera is configured to capture and output a panoramic real-time video feed, and wherein a displayed portion of the panoramic real-time video feed in the virtual model is adjusted based on an orientation of the virtual model.

5. The monitoring system of claim 1, wherein the virtual model comprises a rendering of a virtual attraction track, and wherein the virtual location is adjacent to the virtual attraction track.

6. The monitoring system of claim 1, comprising one or more sensors configured to transmit data indicative of a position of one or more moving elements within the predetermined area, and wherein the control system is configured to update the virtual model based on the position of the one or more moving elements.

7. A monitoring system, comprising:
a video assembly comprising at least one camera disposed in a predetermined area, wherein the at least one camera is configured to capture and output real-time images of a physical location in the predetermined area; and
a control system configured to receive the real-time images from the at least one camera, wherein the control system comprises:
a memory device;
a processor configured to generate a virtual model of the predetermined area in a virtual space based on instructions stored on the memory device, wherein the processor is configured to overlay at least one virtual video display onto the virtual space based on the real-time images, wherein a position of the at least one virtual video display in the virtual space is based at least in part on a position of the at least one camera in the predetermined area, wherein the virtual model comprises a representation of a virtual vehicle in the predetermined area such that the virtual model transitions from the virtual vehicle to the at least one virtual video display of an actual vehicle while the actual vehicle passes through the physical location corresponding to a virtual location in the virtual model; and
a user interface, comprising:
a display unit configured to display the virtual space for a user; and
an input device configured to provide at least one user-initiated command to the processor to control a camera orientation of the at least one camera.

8. The monitoring system of claim 7, wherein the at least one user-initiated command is configured to control forward-backward movement, up-down movement, side-to-side movement, roll, pitch, and yaw of the camera orientation.

9. The monitoring system of claim 7, wherein the at least one virtual video display is configured to rotate with respect to the virtual model in the virtual space based at least in part on an input from the input device.

10. The monitoring system of claim 7, wherein the processor is configured to generate a viewing window configured to display at least one selected virtual video display in a separate portion of the display unit.

11. The monitoring system of claim 7, wherein a size of the virtual video display with respect to the virtual model is based at least in part on instructions stored on the memory device, an input from the input device, a trigger event, or some combination thereof.

12. The monitoring system of claim 7, wherein the at least one virtual video display is configured to automatically rotate to align the at least one virtual video display with the camera orientation, such that the virtual video display is viewable on the display unit from a plurality of camera orientations.

13. The monitoring system of claim 7, comprising an audio assembly comprising at least one audio input device positioned proximate the at least one camera and configured to transmit a real-time audio feed to the control system.

14. The monitoring system of claim 13, wherein the user interface comprises an audio output device configured to output a real-time audio output feed when the at least one virtual display corresponding to the at least one camera is selected by the input device.

15. A monitoring system, comprising:
a video assembly comprising at least one camera disposed in an amusement park attraction and configured to transmit a real-time video feed of a physical location of the amusement park attraction;
a sensor assembly configured to detect a position of a ride vehicle in the amusement park attraction; and
a control system configured to receive the real-time video feed from the at least one camera and the detected position of the ride vehicle, wherein the control system comprises:
a memory device;
a processor configured to generate a virtual model of the amusement park attraction and a virtual ride vehicle disposed in the virtual model based on instructions stored on the memory device, wherein the processor is configured to overlay at least one virtual video display onto the virtual model based on the real-time video feed, wherein a position of the at least one virtual video display overlaid on the virtual model is based at least in part on the physical location; wherein a position of the virtual ride vehicle in the virtual model changes based at least in part on the detected position of the ride vehicle in the amusement park attraction, and wherein the virtual model transitions from the virtual vehicle to the real-time video feed of the ride vehicle while the detected position of the ride vehicle corresponds to the physical location; and
a display unit configured to display the virtual model.

16. The monitoring system of claim 15, wherein the sensor assembly is configured to detect a guest device corresponding to a guest, and wherein the processor is configured to:
receive a detected position of the guest device;
generate an avatar in the virtual model based on instructions stored on the memory device, wherein a position of the avatar in the virtual model is based at least in part on the detected position of the guest device in the amusement park attraction; and
update the avatar in the virtual model based on an updated position of the guest device.

17. The monitoring system of claim 15, wherein the at least one camera comprises a camera disposed on a ride vehicle in the amusement park attraction, wherein the at least one camera is configured to transmit a video feed of a passenger portion of the ride vehicle.

18. The monitoring system of claim 15, wherein the virtual model comprises a filter tool configured to selectively toggle display of the at least one virtual video display, the virtual ride vehicle, an avatar corresponding to a guest, or some combination thereof.

19. The monitoring system of claim 15, wherein the controller is configured to update the virtual model such that the virtual vehicle is not displayed within the virtual model when a position of the ride vehicle corresponds to the physical location of the amusement park attraction such that the ride vehicle is visible within the virtual video display.

* * * * *